United States Patent [19]

Meyn

[11] Patent Number: 5,277,650
[45] Date of Patent: Jan. 11, 1994

[54] APPARATUS FOR REMOVING THE ENTRAILS FROM THE ABDOMINAL CAVITY OF POULTRY

[75] Inventor: Cornelis Meyn, Oostzaan, Netherlands

[73] Assignee: Machinefabriek Meyn B.V., Oostzaan, Netherlands

[21] Appl. No.: 962,456

[22] Filed: Oct. 16, 1992

[30] Foreign Application Priority Data

Oct. 23, 1991 [NL] Netherlands ............... 9101768

[51] Int. Cl.$^5$ .................. A22B 5/00; A22C 21/00
[52] U.S. Cl. ........................... 452/182; 452/117
[58] Field of Search .............. 452/182, 106, 117

[56] References Cited

U.S. PATENT DOCUMENTS

| Re. 32,402 | 4/1987 | Graham et al. ............... 452/117 |
| 2,739,345 | 3/1956 | Kristmann et al. |
| 3,510,907 | 5/1970 | Rejsa et al. |
| 4,178,659 | 12/1979 | Simonds |
| 4,467,498 | 8/1984 | Graham et al. |
| 4,574,428 | 3/1986 | Meyn |

FOREIGN PATENT DOCUMENTS 0155014 9/1985 European Pat. Off.
0357843 3/1990 European Pat. Off.
0391467 10/1990 European Pat. Off.

Primary Examiner—Willis Little
Attorney, Agent, or Firm—Dority & Manning

[57] ABSTRACT

The invention relates to an apparatus for removing the entrails from the abdominal cavity of poultry suspended by its legs from a suspension conveyor wherein the entrails, after being entirely disconnected, are moved along over some distance synchronously with the poultry by a belt conveyor. Transferring the entrails from the eviscerating means towards the belt conveyor occurs through a transferring device preferably comprising a drum rotatable around a vertical axis and being provided with transferring means regularly spaced on its circumference. Two cooperating clamping parts movable relative to each other are applied at each respective transferring means.

9 Claims, 2 Drawing Sheets

APPARATUS FOR REMOVING THE ENTRAILS FROM THE ABDOMINAL CAVITY OF POULTRY

BACKGROUND OF THE INVENTION

The invention relates to an apparatus for removing the entrails from the abdominal cavity of poultry suspended by its legs from a suspension conveyor, for entirely disconnecting the entrails and for moving these along over some distance synchronously with the poultry, with eviscerating means for removing and disconnecting the entrails and with a conveyor for moving along the disconnected entrails.

Such an apparatus is already described in U.S. patent application Ser. No. 07/938,000 filed on Aug. 28, 1992 of applicant. The apparatus described therein comprises an endless conveyor following a substantially horizontal track. This conveyor carries a number of conveying means for taking over from the eviscerating means the entrails are conveyed by the conveying means in a suspended manner. Using the apparatus described in Dutch patent application 91.01484 it is possible to entirely separate the entrails from the poultry but nevertheless move these along over some distance synchronously therewith, such that during a veterinary inspection it is completely clear to what bird each entrails package belongs.

SUMMARY OF THE INVENTION

It is an object of the invention to further improve the apparatus of Dutch patent application 91.01484.

Thus, the apparatus according to the invention is characterized in that the conveyor comprises a belt conveyor disposed in a manner for supporting the disconnected entrails, where a transferring device is provided for transferring the entrails from the eviscerating means to the belt conveyor.

Using the apparatus according to the invention the entrails are no longer moved along over some distance synchronously with the poultry in a suspended manner, but in a lying manner. In practice, the entrails lying on the belt conveyor assume such a position that an inspection thereof may be carried out very quickly and in a reliable way. Further, the application of a belt conveyor and a transferring device for transferring the entrails from the eviscerating means to the belt conveyor provides for conveying the entrails at a minimal distance from the poultry. The labor circumstances for the veterinary inspector are thus further simplified.

In a preferred embodiment of the apparatus according to the invention the transferring device comprises a drum rotatable around a vertical axis, which is provided with transferring means spaced regularly on its circumference. Per se devices shaped as rotating drums are already applied in many different shapes for processing poultry. Generally, such a drum has a circumferential velocity which equals the conveying velocity of the suspension conveyor. In the present invention the circumferential velocity equals the velocity of the eviscerating means, so that entrails removed from the abdominal cavity of poultry by these eviscerating means may be taken over in a reliable way. In this aspect it is noted, that the eviscerating means, in a way know per se, may be applied also on the circumference of a drum rotating around a vertical axis of rotation. The drum comprising such eviscerating means is driven by the suspension conveyor. The driving for the rotating drum comprising the transferring means may be carried out by the other drum, wherein, for example, both drums comprise interengaging gears or meshing gears.

Preferably each of the transferring means comprises two cooperating clamping parts, vertically movable relative to each other. In this aspect, the upper clamping part is movable up and down along a guide, whereas the lower clamping part is rotatable around a horizontal axis. In a position for receiving the entrails, the upper clamping part is located at some distance above the lower clamping part, which is in a pivot position in which a maximum spacing is offered for receiving the entrails. Next, the upper clamping part is moved downward in the direction of the lower clamping part which is pivoted to a position in which cooperation occurs between the upper clamping part and the lower clamping part, thus gripping the entrail package. The lower clamping part rotates in accordance with a preferred constructive embodiment of the apparatus while the upper clamping part comprises at its lower side a stopper means for engaging the lower clamping part for the rotation thereof.

Further, the engagement of the clamping parts on the entrails may be further improved, if at least some of the clamping parts are provided with a substantially V-shaped recess at their end for receiving the entrails. As a result it is possible that each upper clamping part comprises such a V-shaped recess. In such a case, the lower clamping parts are plate-shaped in the cooperating position of the clamping parts for closing the V-shaped recess after receiving the entrails.

BRIEF DESCRIPTION OF THE DRAWINGS

Hereinafter the invention will be elucidated further referring to the drawing, in which an embodiment of the invention is illustrated.

DETAILED DESCRIPTION OF THE INVENTION

Figure 1:
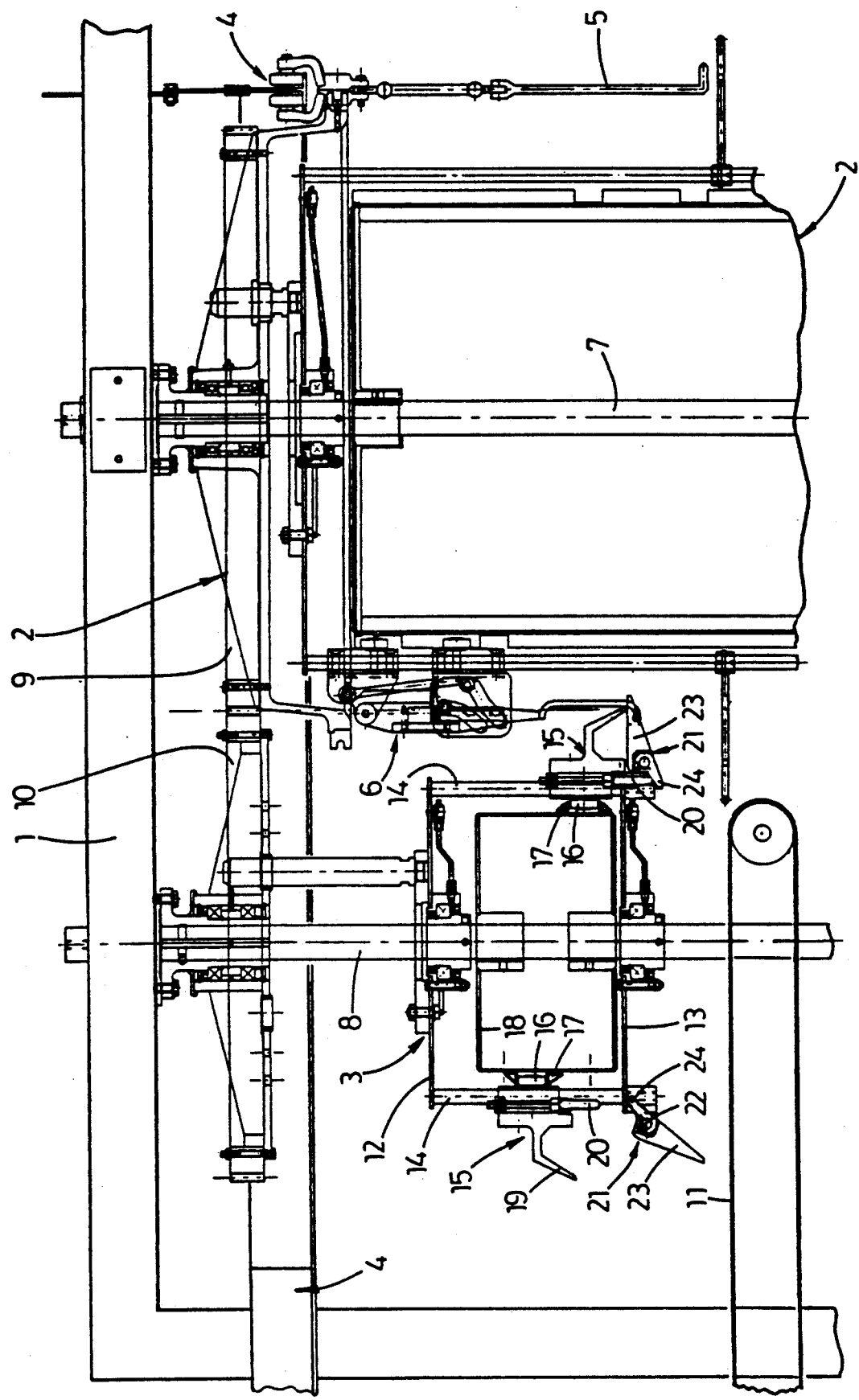
FIG. 1 is a partly broken away side elevational view of an embodiment of the invention.

The apparatus illustrated in FIG. 1 comprises two rotating devices 2 and 3 mounted in a frame 1. The basic structure of such rotating devices is known in the field of processing poultry, such that a further detailed description thereof is not necessary.

In a way known, per se, the rotating device is driven by a suspension conveyor 4 which comprises hooks 5 for suspending poultry to be processed by their legs. Divided on its circumference the rotating device 2 carries eviscerating means 6 (in FIG. 1 only one being shown at the left side of the rotating device 2). In a way known, per se, the entrails are removed by eviscerating means 6 from the abdominal cavity of the poultry suspended by its legs from the suspension conveyor 4, when the hooks 5 of the suspension conveyor 4 move along over part of the circumference of the rotating device 2 and synchronously therewith. In the position of the eviscerating means 6 (which is shown on the left hand side of FIG. 1) removal of the entrails from the abdominal cavity of the poultry has been completed. In such a position the entrails are entirely disconnected from the respective bird and are suspended from the lower side of the eviscerating means 6.

Alongside of the rotating device 2, a second rotating device 3 is mounted, as mentioned before. The rotation of the rotating device 2 around the respective vertical axis 7 caused by the suspension conveyor 4 further leads to a rotation of the rotating device 3 around a respective vertical axis of rotation 8. For this purpose the rotating device 2 comprises at its upper side a gear 9 non-rotatably connected therewith, which engages a gear 10 non-rotatably connected with the rotating device 3. The rotating device 3 is a transferring device for transferring entrails removed from the poultry by the rotating device 3 by the eviscerating means 6 to a belt conveyor 11. This belt conveyor 11 will be elucidated further later on.

The transferring device 3, shaped as a rotating device substantially comprises an upper plate 12 and a lower plate 13 that are, in a rotatable manner, mounted on the axis of rotation 8, and guide rods 14 regularly spaced on the circumference of the drum and connecting the upper plate 12 to the lower plate 13.

Upper clamping parts 15 are movable up and down along the guide rods 14. For causing the up and down movement of the upper clamping parts 15, each of these carry a follower roll 16 cooperating with a curved track 17, which has been shaped on a stationary cylinder 18 which is mounted non-rotatably on the vertical axis of rotation 8.

Each upper clamping part 15 comprises a gripper arm 19 for, in a way to be described later, gripping an entrails package.

At its lower side each upper clamping part 15 comprises a stopper means 20. This stopper means 20 may cooperate with a lower clamping part 21, located below each upper clamping part 15 and being rotatable around a horizontal axis 22. Each lower clamping part 21 comprises an outwardly directed plate-shaped part 23 and an operating part 24 extending at the opposite side of the horizontal axis 22. In FIG. 1 it has been indicated on the left hand side that, when the upper clamping part 15 is located at some distance above the lower clamping part 21 the stopper means 20 does not engage the operating part 24, such that the plate-shaped part 23 is in its illustrated downwardly inclined position. When the upper clamping part 15, as forced by the track of the curved track 17, moves downward, the stopper means 20 engages the operating part 24 so that the lower clamping part 21 is pivoted around the horizontal axis 22 until reaching the position of the upper clamping part 15 and lower clamping part 21 illustrated in FIG. 1 at the right hand side of the rotating drum. In this position the plate-shaped part 23 joins the end of the gripping means 19, so that a cooperation occurs between the upper clamping part 15 and lower clamping part 21.

Through an appropriate choice of control of the eviscerating means 6 of the rotating drum 2 and an appropriate choice of the movement of the upper and lower clamping parts 15, 21 respectively, it is possible to receive between upper clamping part 15 and lower clamping part 21 entrails packages offered by the eviscerating means 6, to convey these over some distance by means of the rotating device 3, and next to supply these to the belt conveyor 11. Referring to the schematical top plan view according to FIG. 2 the following may be noted in relation therewith. Poultry to be processed is supplied by the suspension conveyor 4 in the direction indicated by arrow A. Having reached the rotating device 2 the eviscerating means 6 remove the entrails from the abdominal cavity of the poultry. In the position of eviscerating means 61 the removed entrails are transferred to the transferring device 3 and are received by clamping parts 15, 21. Next the entrails are freed at the belt conveyor 11 and will be lying on this belt conveyor 11 which conveys the entrails in the direction of arrow B.

Figure 2:
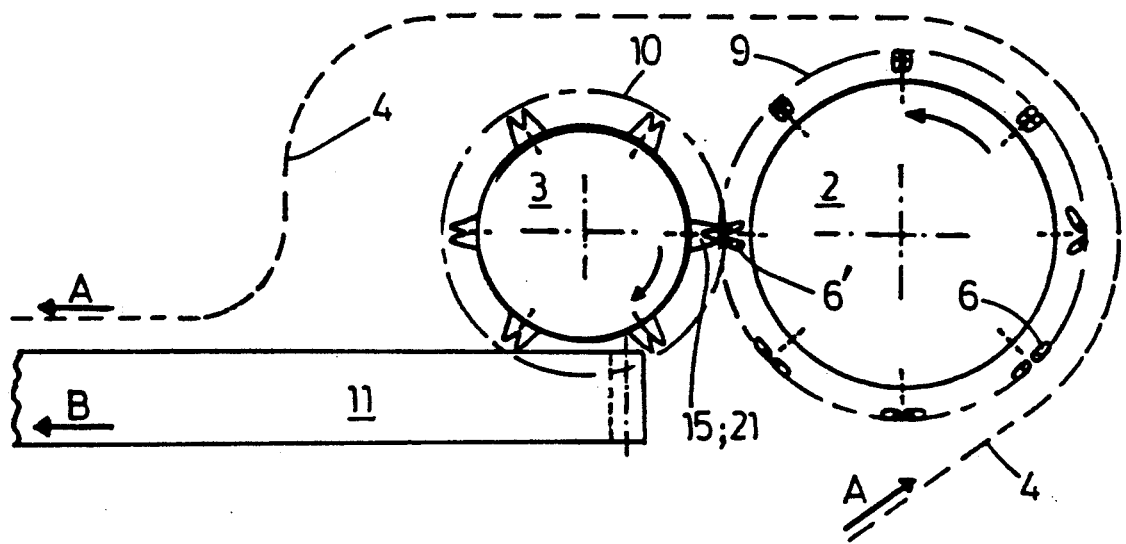
FIG. 2 is a schematic top plan view of the apparatus illustrated in FIG. 1.

As schematically indicated on the left hand side of FIG. 2 the belt conveyor 11 extends synchronously with the suspension conveyor 4 so that the entrails and corresponding poultry are moved along synchronously at a short distance from each other. Thus, an examination to be carried out by the veterinary inspection is extremely simplified, whereas it appears further that entrails lying on the belt conveyor 11 may be checked for irregularities in an easy way.

Figure 3:
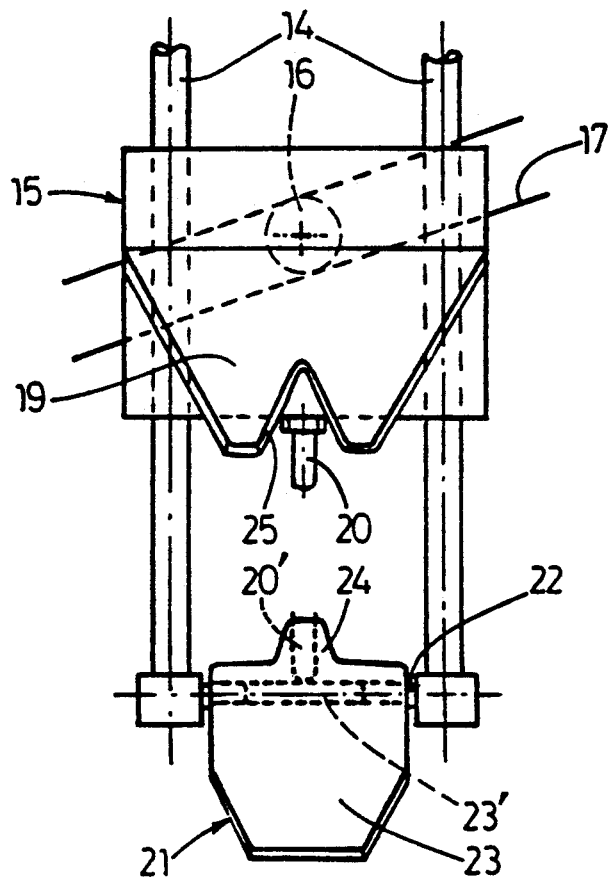
FIG. 3 is a detailed view of the clamping parts applied to an apparatus according to FIG. 1.

In FIG. 3 an embodiment of an upper clamping part 15 and lower clamping part 21 are illustrated on a larger scale. It is clearly visible that the gripping means 19 of the upper clamping part 15 is provided with a V-shaped recess 25, in which an entrails package to be received may be held.

In FIG. 3 in full lines the position is indicated in which the upper clamping part 15 is located at some distance above the lower clamping part 21. In dotted lines partly the position is indicated in which the stopper means 20' engages the operating part 24 and in which the plate-shaped part 23' is in the horizontal position which has been indicated in FIG. 1 at the right hand side of the rotating drum 3. Then the plate shaped part 23 closes the V-shaped recess 25 of the gripper means 19, thus reliably holding an entrails package.

The invention is not limited to the embodiment described before, which can be varied widely within the scope of the invention.

I claim:

1. Apparatus for removing the entrails from the abdominal cavity of poultry suspended by its legs from a suspension conveyor, including means for disconnecting said entrails from said poultry and for moving them along a separate path from said poultry, comprising:
   (a) means for transporting said poultry along a first path comprising a suspension conveyor with means for suspending said poultry by its legs;
   (b) eviscerating means for removing and disconnecting said entrails from the abdominal cavities of said poultry as it moves along a portion of said first path;
   (c) a belt conveyor for supporting and transporting said entrails along a second path spaced from said first path; and
   (d) transferring means interposed between and movable relative said eviscerating means and said belt conveyor for receiving said entrails from said eviscerating means at a first position and for transferring said entrails to said belt conveyor at a second position.

2. Apparatus for removing entrails as set forth in claim 1, wherein said transferring means comprises a drum supported for rotation about a vertical axis with a plurality of transferring devices evenly spaced about the circumference of said drum.

3. Apparatus for removing entrails as set forth in claim 2, wherein each of said transferring devices comprises two cooperating clamping members movable relative to each other for clamping said entrails.

4. Apparatus for removing entrails as set forth in claim 3, wherein said clamping members comprises an upper member supported for vertical movement along a guide and a lower member supported for rotation about a horizontal axis.

5. Apparatus for removing entrails as set forth in claim 4, wherein said upper member comprises a means for engaging said lower member and for causing it to rotate about said horizontal axis.

6. Apparatus for removing entrails as set forth in claim 4, wherein said upper clamping member comprises a follower roll and said transferring means comprises a stationary curved track means for engaging said follower roll as said drum rotates to cause said upper clamping member to move up and down along said guide.

7. Apparatus for removing entrails as set forth in claim 3, wherein at least one of said clamping member comprises a V-shaped recess for receiving said entrails.

8. Apparatus for removing entrails as set forth in claim 6, wherein said track moves said upper clamping member into clamping contact with said lower member to clamp said entrails and to remove said entrails from said eviscerating means.

9. Apparatus for removing entrails as set forth in claim 8, wherein said track moves said upper clamping member out of clamping contact with said lower clamping member for laying said entrails onto said belt conveyor.

* * * * *